Dec. 5, 1950     P. SIEVER     2,532,861
THROTTLE CONTROL DEVICE
Filed Dec. 5, 1946     2 Sheets-Sheet 1
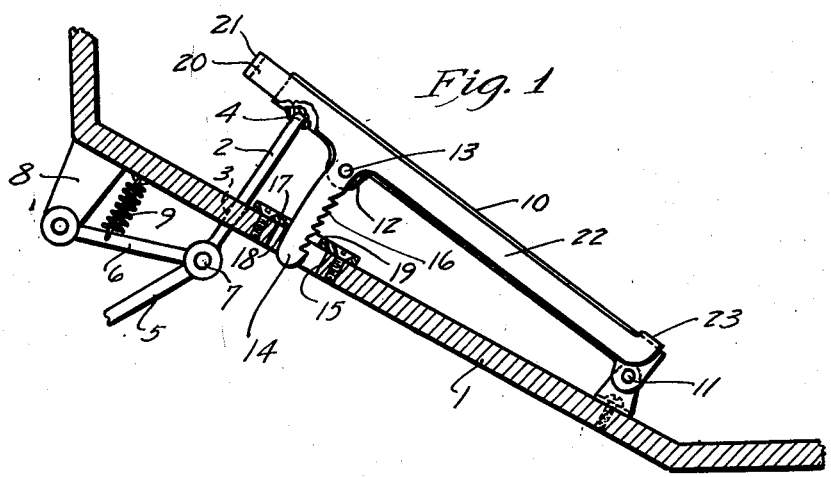
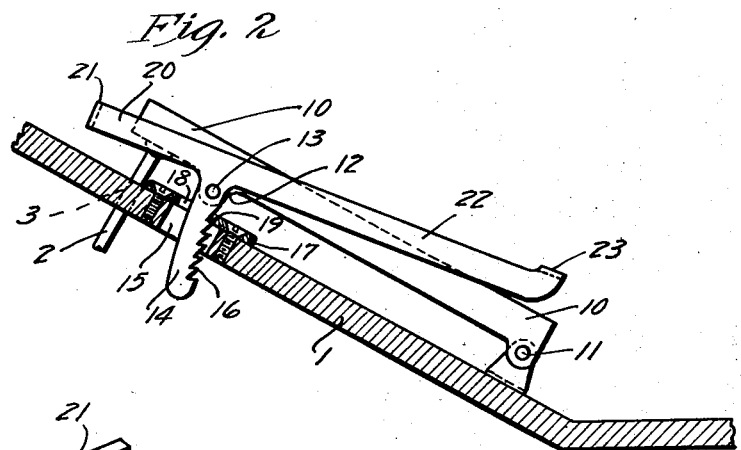
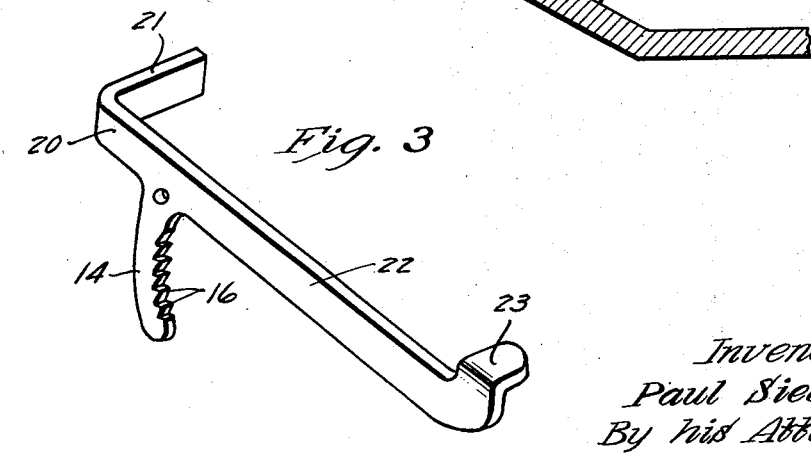
Inventor
Paul Siever
By his Attorneys
Merchant & Merchant Dec. 5, 1950  P. SIEVER  2,532,861
THROTTLE CONTROL DEVICE
Filed Dec. 5, 1946  2 Sheets-Sheet 2
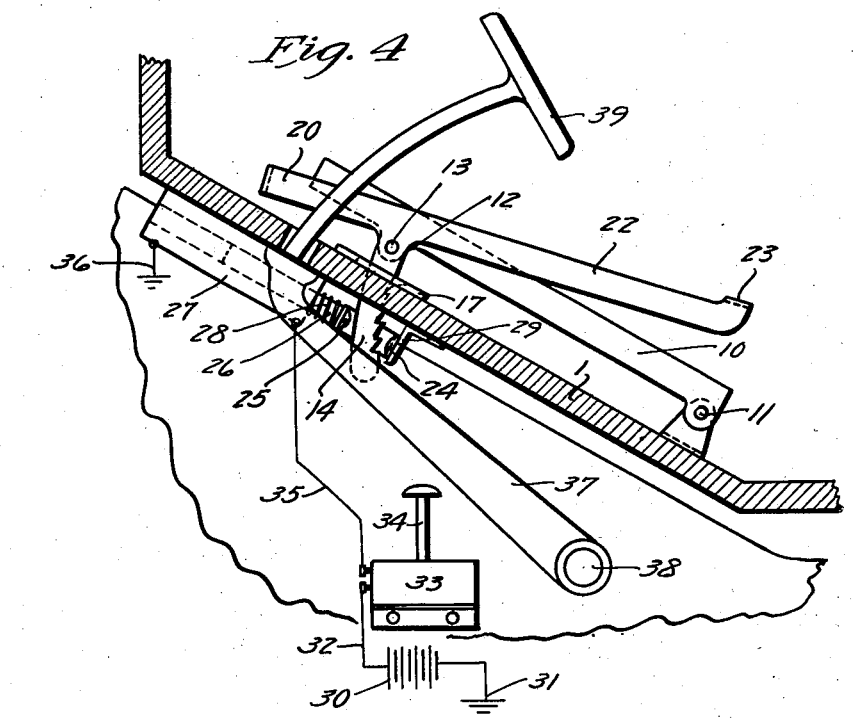
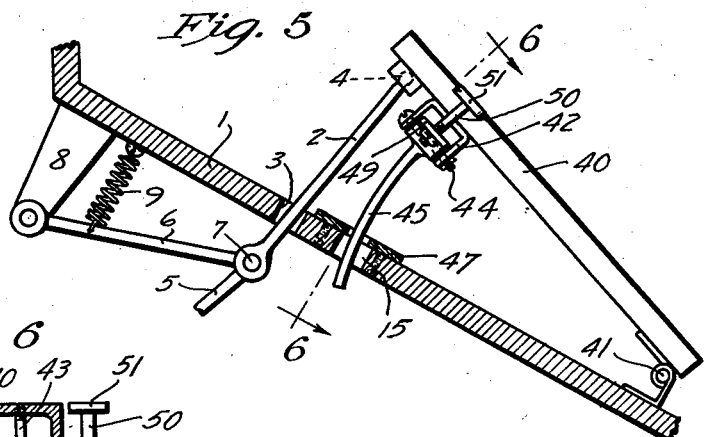
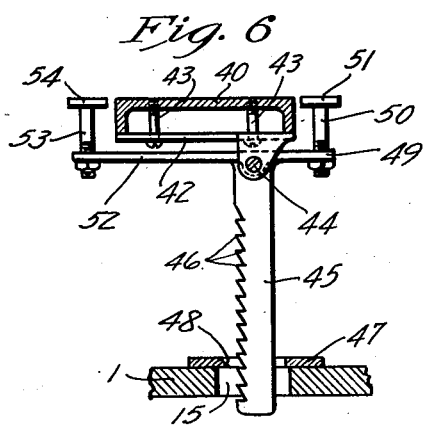
Inventor
Paul Siever
By his Attorneys
Merchant & Merchant Patented Dec. 5, 1950

2,532,861

UNITED STATES PATENT OFFICE 2,532,861

THROTTLE CONTROL DEVICE

Paul Siever, Minneapolis, Minn.

Application December 5, 1946, Serial No. 714,284

3 Claims. (Cl. 74—542)

My invention relates to improvements in control mechanisms for motor vehicles and has particular reference to an accelerator controlled device.

An object of my invention is to provide a simple, inexpensive, and practical device which may be applied to various standard types of motor vehicles and in which improved means are provided for releasably maintaining the accelerator in various adjusted positions so that a substantially constant speed may be maintained while the foot of the vehicle operator is temporarily removed from the accelerator pedal, for any one of a number of reasons.

Another important object of my invention is the provision of a device in which the mechanism for maintaining the accelerator pedal in a given adjusted position is normally held inoperative under the action of gravity, so as to permit normal use of the accelerator pedal, and to require manual setting of the locking mechanism.

Another object of my invention is the provision of additional safety or precautionary mechanism associated with the brake mechanism whereby when the brake mechanism is put into operation, the mechanism for temporarily locking the foot throttle, in an adjusted position, will be automatically released.

The above and other objects will appear more clearly from the following detailed description when taken in connection with the accompanying drawings which illustrate the preferred embodiment and modified forms of my invention.

Referring to the drawings wherein like characters indicate like parts throughout the several views:

Fig. 1 is a view in cross section of the floor board in the driver's compartment of a motor vehicle, showing my improved device, in side elevation, attached thereto;

Fig. 2 is a view corresponding to Fig. 1, but showing a different position of some of the parts;

Fig. 3 is a view in perspective of a ratchet and lever means of my invention;

Fig. 4 is a view corresponding somewhat to Fig. 2, but showing a modified form of my invention;

Fig. 5 is a view corresponding to Fig. 1 and showing a still further modified form of my device; and Fig. 6 is a section taken on the line 6—6 of Fig. 5.

Referring with greater particularly to the drawings, particularly to Figs. 1 to 3 inclusive, the numeral 1 indicates the normally slanting portion of a floor board of a motor vehicle, and the numeral 2 indicates the conventional accelerator rod which projects upwardly through an opening 3 in the floor board and terminates at its free end in a head 4. Beneath the floor board 1, the accelerator rod is connected to an extension rod 5 which leads to the throttle valve of a carburetor, not shown. A link 6 is pivoted at 7 to the accelerator rod 2 and at its opposite end to a bracket 8 secured to the floor board. As shown, a coil extension spring 9 is interposed between the floor board 1 and the link 6 whereby to bias the accelerator rod 2 in an upward direction. The upper end 4 of the accelerator rod 2 engages a foot pedal 10 which at one end is hingedly mounted to the floor board, as at 11.

One longitudinal edge of the pedal 10 preferably, and as shown, has, adjacent the driver, a depending lug 12 to which is pivoted as at 13 a depending ratchet 14. The ratchet 14 extends downwardly through an opening 15 in the floor board 1 and is provided with upwardly and outwardly projecting teeth 16. Cooperating latch means, as shown in the form of a latch plate 17, is secured by screws or otherwise to the floor board 1 surrounding the opening 15 thereof. An opening 18 in the latch plate 17, which directly overlies the opening 15 in the floor board 1, is provided with a latch or pawl detent 19.

Preferably integrally formed with the ratchet 14 and extending longitudinally of the foot pedal 10 adjacent one side thereof is a relatively short lever arm 20 which terminates in a foot engaging portion 21 adjacent the front end of the foot pedal 10 for engagement with the toe of the operator. Also preferably integrally formed with the ratchet 14 and extending longitudinally of the foot pedal 10 is a relatively long lever arm 22. The lever arm 22 is, as shown, in direct opposition to the relatively short lever arm 20 and at its extreme end is provided with an inturned foot engaging flange 23 which preferably, and as shown, overlies the upper surface of the foot pedal 10 adjacent its lower end.

Due to the length of the relatively long lever arm 22, it should be obvious that, under the action of gravity, said arm 22 will drop on pivot 13 with respect to short arm 20, thereby biasing teeth 16 of the ratchet 14 out of engagement with the pawl 19. (See particularly Fig. 1.)

*Operation of the structure of Figs. 1 to 3 inclusive*

When the vehicle operator wishes to temporarily relieve his foot from the continuous and monotonous pressure which it exerts upon the foot pedal 10, he merely presses his toe downwardly upon the foot engaging portion 21 of the short lever arm 20 to bring one of the teeth 16 of the ratchet 14 into operative engagement with the pawl 19. The speed of the vehicle during the momentary absence of the operator's foot from the foot pedals is determined by the setting of said foot pedal when the ratchet 14 is swung into engagement with the pawl 19. The tension of the spring 9 upon the foot pedal 10 through link 6 and accelerator rod 2 exerts sufficient pressure upon the cooperating pawl and ratchet to frictionally maintain the same in operative engagement against accidental release. To release the ratchet 14 from engagement with the pawl 19, it is but necessary for the operator to exert a very light pressure upon the foot pedal 10, whereby under the action of gravity, the heavy, relatively long lever arm 22 will swing from the position shown in Fig. 2 to that of Fig. 1. To positively disengage the teeth 16 of the ratchet 14 from the pawl 19, it is but necessary for the operator to exert downward pressure upon the flange 23 of the relatively long lever arm 22.

In the modified form shown in Fig. 4, I provide mechanism remote from the cooperating pawl and ratchet for automatically releasing the same from engagement. There, one such mechanism is disclosed in conjunction with the brake pedal mechanism and includes a ratchet releasing hook 24 which is rigidly secured by a screw 25 or the like to the armature 26 of a solenoid 27. The solenoid 27 is suitably mounted to the under side of the floor board 1, and the rack engaging hook 24 and armature 26 are normally biased away from engagement with the ratchet 14 by means of a coil compression spring 28 encompassing the armature 26. Stop bracket 29 limits outward travel of the armature 26 and the hook 24. The solenoid 27 is actuated by a battery 30 or other source of current. One side of the battery is grounded as at 31. A lead 32 extends from one side of the battery to a switch 33 which is provided with a switch arm 34. A lead 35 extends from the switch 33 to one end of the coil of solenoid 27, the other end of which is grounded at 36.

The switch 33 is closed by pressure exerted upon the switch arm 34 by the brake lever 37 of the vehicle which is pivoted to part of the transmission housing as at 38. The brake lever 37 is provided at its free end with a foot engaging pedal portion 39. In all other respects, the structure of Fig. 4 is identical to that of Figs. 1 to 3 inclusive and bears the same identification indicia.

In the modified form of my invention illustrated in Figs. 5 to 6 inclusive, the floor boards and throttle actuating mechanism are identical to the structures of Figs. 1 to 3 inclusive and also bear the same characters. However, as there shown, the foot pedal 40, which is pivoted to the floor board 1 at 41, is provided with a bracket 42 which extends transversely of the pedal 40 and is preferably fastened thereto by screws or the like 43. The bracket 42 is provided with a pair of downturned flanges which are pierced to receive a pivot pin or screw 44. Mounted for swinging movements on the pivot pin 44 is a ratchet 45 provided with teeth 46 along one longitudinal edge thereof. The ratchet 45 is adapted to pass through the opening 15 on the floor board 1 and through a latch plate 47 attached thereto. The latch plate 47 is similar to the latch plate 17 and is equipped with a pawl or detent 48. Preferably integrally formed with and extending at right angles to ratchet 45 is a relatively short lever arm 49 which is threaded adjacent its free end to receive a lock nut equipped stud 50 formed with a foot engaging pad 51 at its upper end. A relatively long lever arm 52 extends from the ratchet 45 in a direction opposite to lever arm 49 and is threaded at its outer end to receive a lock nut equipped stud 53 which has a foot engaging pad 54 at its upper end. It will be noted (see Fig. 6) that the studs 50 and 53 are spaced one on each side of the foot pedal 40 and that the pads 51 and 54 are substantially level with the top surface of the pedal 40 and are vertically adjustable. The weight of the long lever arm 52 biases the ratchet 45 away from the pawl 48 of the latch plate 47; but as in the structure of Figs. 1 to 3 inclusive, sufficient friction is maintained between the teeth 46 of the ratchet and the pawl 48 by action of the spring 9 to firmly hold the pedal 40 in any set position.

While I have illustrated several modified forms of my invention, it should be obvious that the same may be still further modified without departure from the scope of the appended claims.

What I claim is:

1. In a device of the class described, a foot pedal adapted to be pivotally mounted on the floor boards of a vehicle in a position to engage and actuate the accelerator, a ratchet pivoted to said foot pedal and adapted to work through an opening in the floor board, a pawl adapted to be secured to the floor board adjacent the opening, opposed long and short lever arms secured to said ratchet, said long lever arm extending from said ratchet in a direction to gravity bias said ratchet away from engagement with said pawl, said short lever arm terminating in a foot engaging portion adjacent one side of said foot pedal and adapted to effect engagement of said ratchet with said pawl when the same is depressed, said long lever arm terminating in a foot-engaging portion adjacent a different side of said foot pedal and adapted to disengage said ratchet from said pawl when the same is depressed, and means for varying the elevation of the foot-engaging portions on each of said lever arms with respect to said foot pedal.

2. In a device of the class described, a foot pedal adapted to be pivotally mounted on the floor boards of a vehicle in a position to engage and actuate the accelerator, a ratchet pivoted to said foot pedal and adapted to work through an opening in the floor board, a pawl adapted to be secured to the floor board adjacent the opening, and opposed long and short lever arms secured to said ratchet, said long lever arm extending from said ratchet in a direction to gravity bias said ratchet away from engagement with said pawl, said short lever arm terminating in a foot-engaging portion adjacent one side of said foot pedal and adapted to effect engagement of said ratchet with said pawl when the same is depressed, said long and short lever arms extending along one longitudinal side edge of said foot pedal, said long arm terminating in a foot-engaging portion overlying the foot pedal adjacent its pivotal connection to the floor board.

3. In a device of the class described, a foot pedal adapted to be pivotally mounted on the floor boards of a vehicle in a position to engage and actuate the accelerator, a ratchet pivoted to said foot pedal and adapted to work through an opening in the floor board, a pawl adapted to be secured to the floor board adjacent the opening, and opposed long and short lever arms secured to said ratchet, said long lever arm extending from said ratchet in a direction to gravity bias said ratchet away from engagement with said pawl, said short lever arm terminating in a foot-engaging portion adjacent one side of said foot pedal and adapted to effect engagement of said ratchet with said pawl when the same is depressed, said long arm lever terminating in a foot-engaging portion on the opposite side of the foot pedal and adapted to disengage said ratchet from said pawl when the same is depressed.

PAUL SIEVER.

REFERENCES CITED

The following references are of record in the file of this patent:

UNITED STATES PATENTS

| Number | Name | Date |
| --- | --- | --- |
| 1,224,034 | Starr | Apr. 24, 1917 |
| 1,281,891 | Anderson | Oct. 15, 1918 |
| 1,402,883 | Newberry | Jan. 10, 1922 |
| 1,633,348 | Petsch | June 21, 1927 |
| 1,662,211 | Shier | Mar. 13, 1928 |
| 1,826,906 | Townsend | Oct. 13, 1931 |